United States Patent [19]

Chen

[11] Patent Number: 5,698,092
[45] Date of Patent: Dec. 16, 1997

[54] IN-SITU OXIDIZING ZONE REMEDIATION SYSTEM FOR CONTAMINATED GROUNDWATER

[76] Inventor: Youzhi Chen, 23 Crescent St., Apt. E, Derby, Conn. 06418-2708

[21] Appl. No.: 511,648

[22] Filed: Aug. 7, 1995

[51] Int. Cl.$^6$ ........................................ C02F 1/72
[52] U.S. Cl. .................... 210/94; 210/96.1; 210/170; 210/220; 210/236; 422/79
[58] Field of Search ........................ 210/170, 198.1, 210/96.1, 199, 205, 220, 221.2, 747, 758, 236, 241; 422/79

[56] References Cited

U.S. PATENT DOCUMENTS

| | | | |
|---|---|---|---|
| 2,218,635 | 10/1940 | Borge | 210/199 |
| 3,505,213 | 4/1970 | Anthony et al. | 210/198.1 |
| 3,834,668 | 9/1974 | Casey | 254/29 |
| 4,593,760 | 6/1986 | Visser et al. | 166/267 |
| 4,660,639 | 4/1987 | Visser et al. | 166/267 |
| 5,221,159 | 6/1993 | Billings et al. | 405/128 |
| 5,362,400 | 11/1994 | Martinell | 210/717 |
| 5,494,374 | 2/1996 | Youngs et al. | 405/52 |

FOREIGN PATENT DOCUMENTS 1308649  10/1992  Canada.

*Primary Examiner*—Peter A. Hruskoci
*Assistant Examiner*—Betsey J. Morrison
*Attorney, Agent, or Firm*—Ware, Fressola, Van Der Sluys & Adolphson LLP

[57] ABSTRACT

A system is provided for producing an oxidizing zone within a saturated zone of an aquifer for in-situ decontamination of groundwater carrying contaminants in a plume wholly located below a water table in said saturated zone of said aquifer. The system comprises a source of gas for providing a gas capable of producing an oxidizing environment in the groundwater which can oxidize the contaminant to purify the groundwater and the aquifer. Gas injectors are connected to the source of gas, for injecting the gas into the groundwater below the plume at a gas injection rate, thereby producing the oxidizing environment in the groundwater. Auxiliary apparatus is provided for testing decomposition of the contaminants in the oxidizing environment and for determining the gas injection rate.

16 Claims, 12 Drawing Sheets

IN-SITU OXIDIZING ZONE REMEDIATION SYSTEM FOR CONTAMINATED GROUNDWATER

FIELD OF THE INVENTION

The invention for in-situ groundwater remediation relates to a system that releases oxygen or oxidizing gas(es) in an aquifer to form an oxidizing zone across a contaminant groundwater plume to purify the groundwater at the location of the contaminant plume and limit the further development and spread of the plume.

DESCRIPTION OF THE PRIOR ART

The growth of population and of industrial and agricultural production since the second world war has begun to produce quantities of waste that are greater than that which the environment can easily absorb. Some data indicate that in the United States there are at least 17 million waste disposal facilities placing more than 6.5 billion cubic meters of liquid into the ground each year (US EPA, 1977). As time goes on, the vast groundwater reservoir of fresh water is gradually becoming degraded.

The polluted groundwater poses a serious environmental problem to both drinking water supply and general groundwater resource and is difficult to remedy. In general, most of the remediation methods involve removing the contamination from the contaminated aquifer and/or groundwater and treating the contaminated materials after the remove. In addition to the high cost of such remediation methods, these methods are inefficient because of the heterogeneity and complex structure of an aquifer. It is common that after spending years of time and thousands, even millions, of dollars of money on remediation of a contaminated site, the aquifer and groundwater are still far from clean.

Under such circumstance, it is preferable to avoid all the removing process and treat the aquifer and groundwater in-situ whenever the contaminant is treatable. Recent horizontal well drilling technology make the in-situ remediation practically possible. Related U.S. Pat. Nos. 4,593,760 and 4,660,639 describe a method by Visser, et. al. for removing volatile contaminants from the upper, unsaturated or "vadose" zone of the groundwater. Wells sunk vertically into the vadose zone may have a casing consisting two sections, an upper unperforated region and a lower perforated region. Volatile contaminants in the vadose zone enter the perforated casing and are pumped past the unperforated casing to the earth's surface for treatment. Furthermore, Canadian patent 1,308,649 characterizes a system and method by Corey, et. al. for stripping volatile contamination from groundwater, which comprise the use of horizontal wells for saturated zone or unsaturated zone injection of fluids that volatilize contaminants and extraction of those volatilized contaminants to remedy contaminated groundwater.

None of these prior art methods are designed for non-volatile contamination nor for in-situ remediation that treat the contaminated groundwater and aquifer without extracting any contaminated materials from the contaminated site.

SUMMARY OF THE INVENTION

It is a object of the present invention to provide a system and method for in-situ remediation of the groundwater and aquifer contaminated by oxidizable contaminants.

It is a further object of the present invention to provide a system and method for treating the groundwater carrying contaminant without removing the groundwater from the aquifer and limiting the advance of a plume of contaminated groundwater.

According to the present invention, an oxidizing zone is produced within a saturated zone of an aquifer for in-situ decontamination of groundwater carrying contaminants in a plume wholly located below a water table in the saturated zone of the aquifer. A source of gas provides a gas capable of producing an oxidizing environment in the groundwater which can oxidize the contaminant to purify the groundwater and the aquifer. A gas injector is connected to the source of gas for injecting the gas into the groundwater below the plume at a gas injection rate, thereby producing the oxidizing environment in the groundwater.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

The accompanying drawings, which are incorporated in and form a part of the specification, illustrate the invention and, together with the description, serve to explain the principles of the invention. In the drawings.

DETAILED DESCRIPTION OF THE INVENTION

Figure 1:
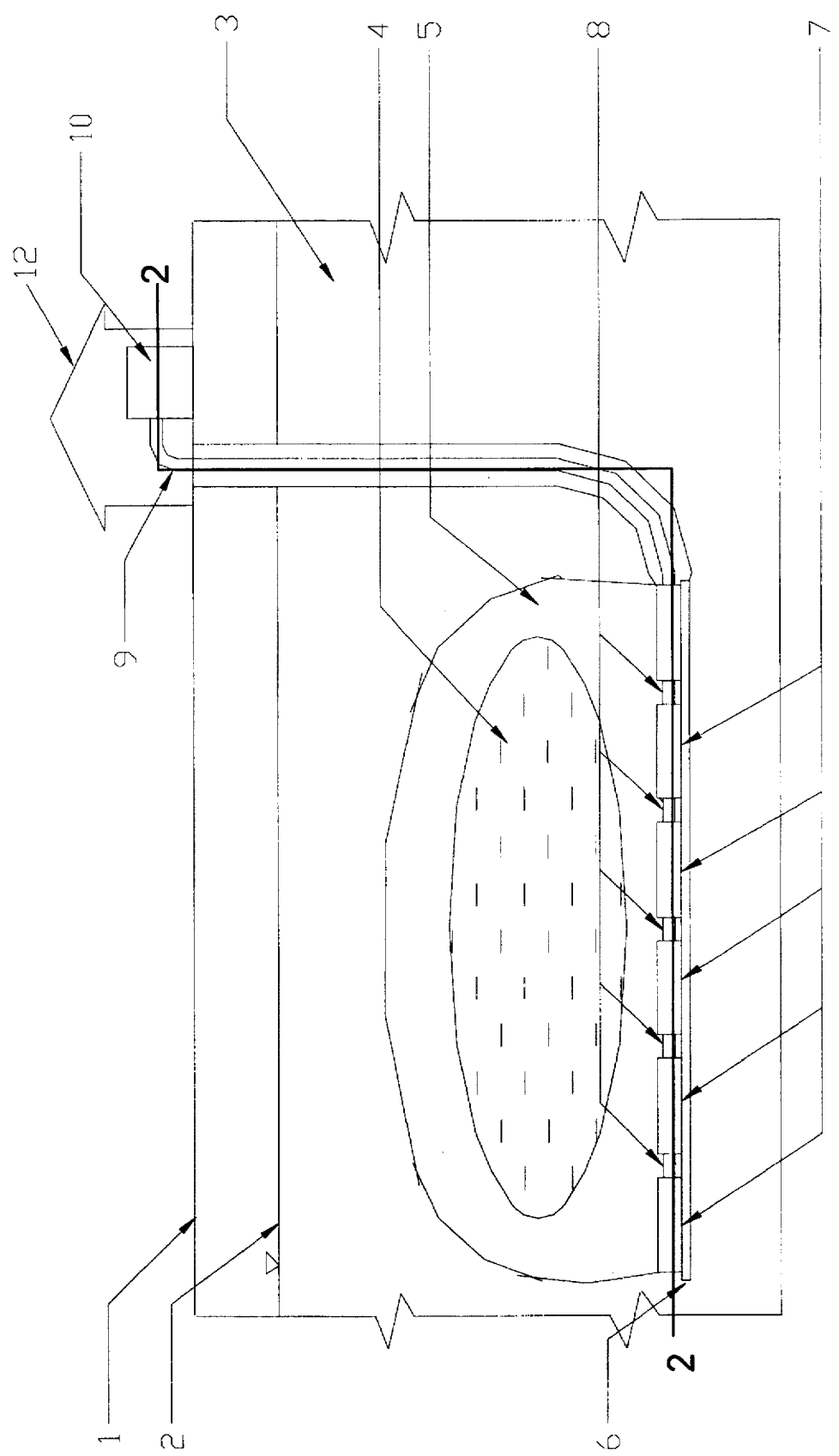
FIG. 1 is a cross-sectional view of an embodiment of the remediation system of the invention.
Figure 2:
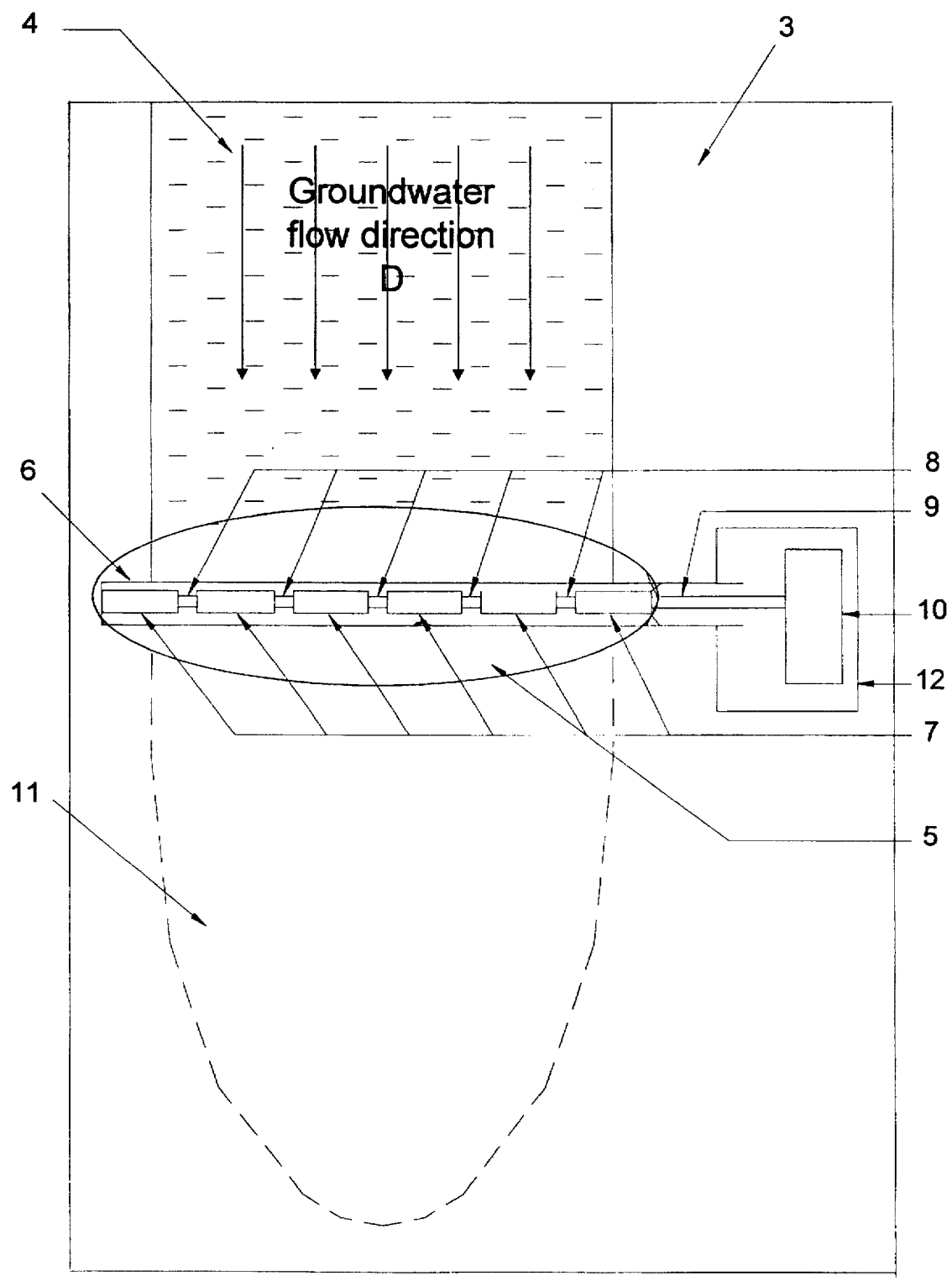
FIG. 2 is a cross-sectional side view taken along line 2—2 of FIG. 1.

Referring to FIGS. 1 and 2, the invention comprises a gas source 10 connected with gas injectors 7 a gas injection system embedded in a generally horizontal well located in the ground 3. The horizontal well is positioned below the plume of contaminated groundwater 4 and perpendicular with its extending direction. The plume of contaminated groundwater 4 is wholly located below a water table 2. The gas source may be located on the surface of the ground 1 in a building or enclosure 12, and is connected to the injectors 7 via a supply 9. As shown in FIG. 2, the ground water travels across the injectors 7 generally in the direction of arrows D, and as shown in FIG. 1, the injectors 7 are located generally under the ground water of concern.

Figure 6:
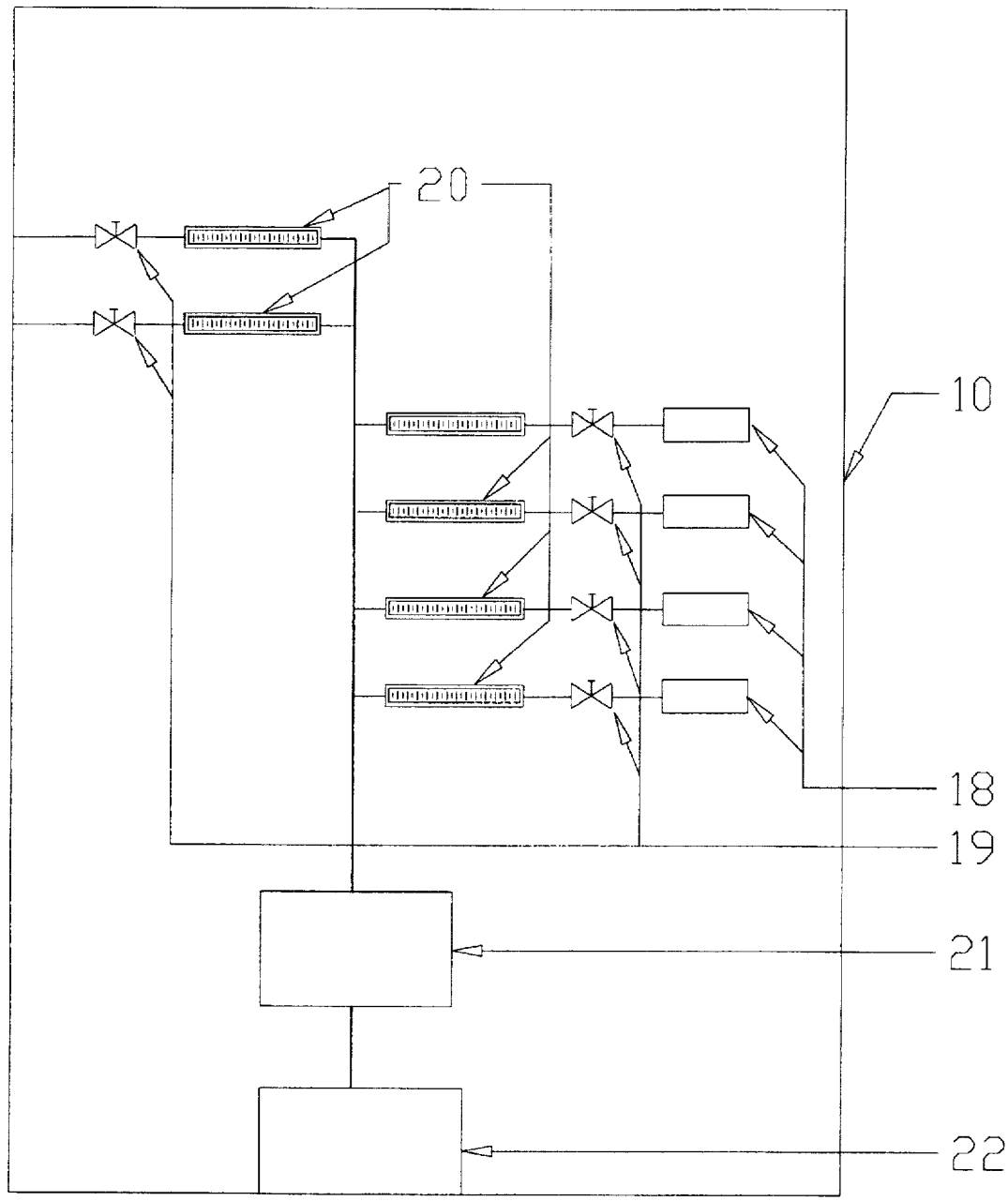
FIG. 6 is a schematic block diagram of a gas source manifold of the system of FIG. 1.
Figure 7:
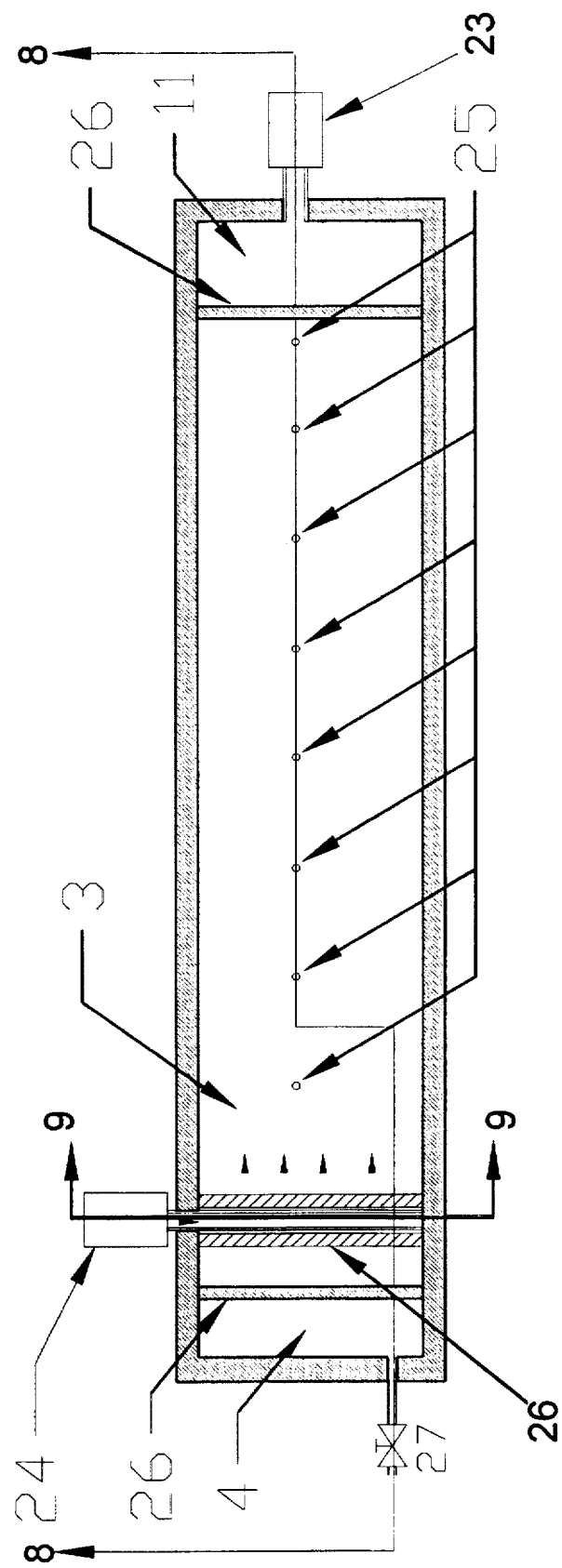
FIG. 7 is a cross-sectional top view of an auxiliary apparatus used for determining a gas source for use with the system of FIG. 1.
Figure 8:
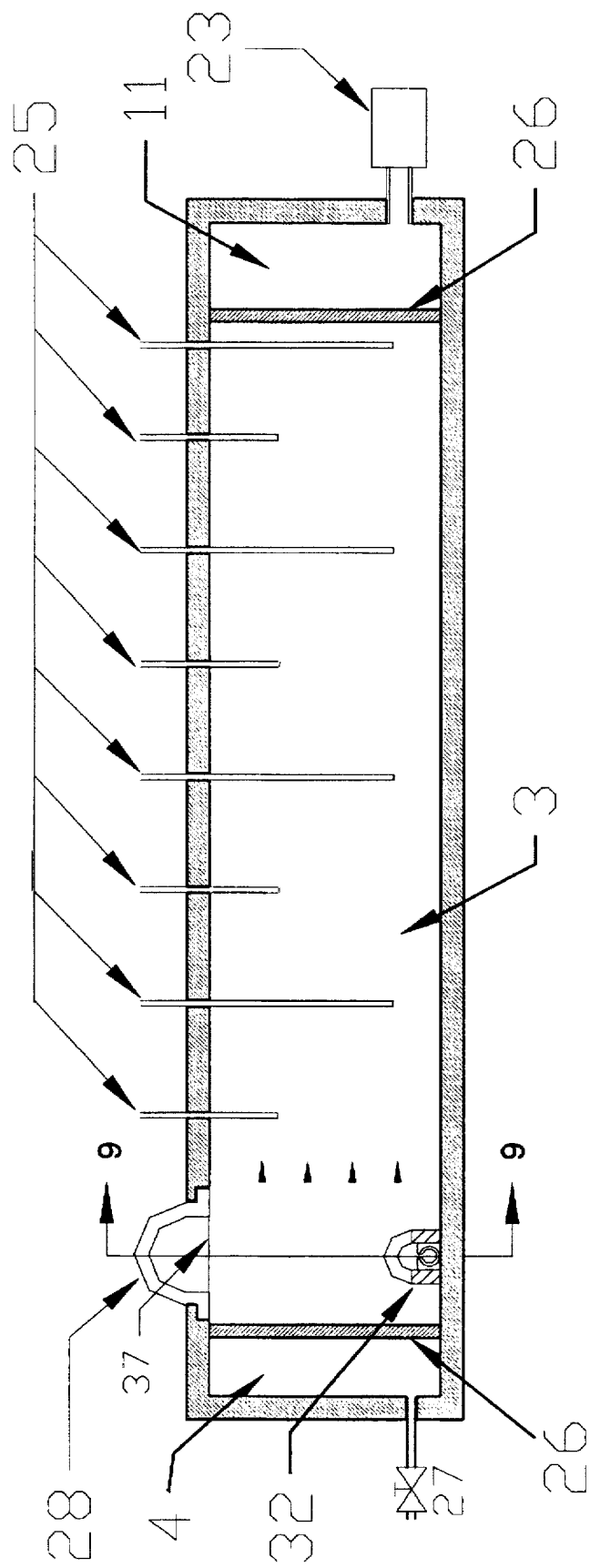
FIG. 8 is a cross-sectional view taken along line 8—8 of FIG. 7.
Figure 9:
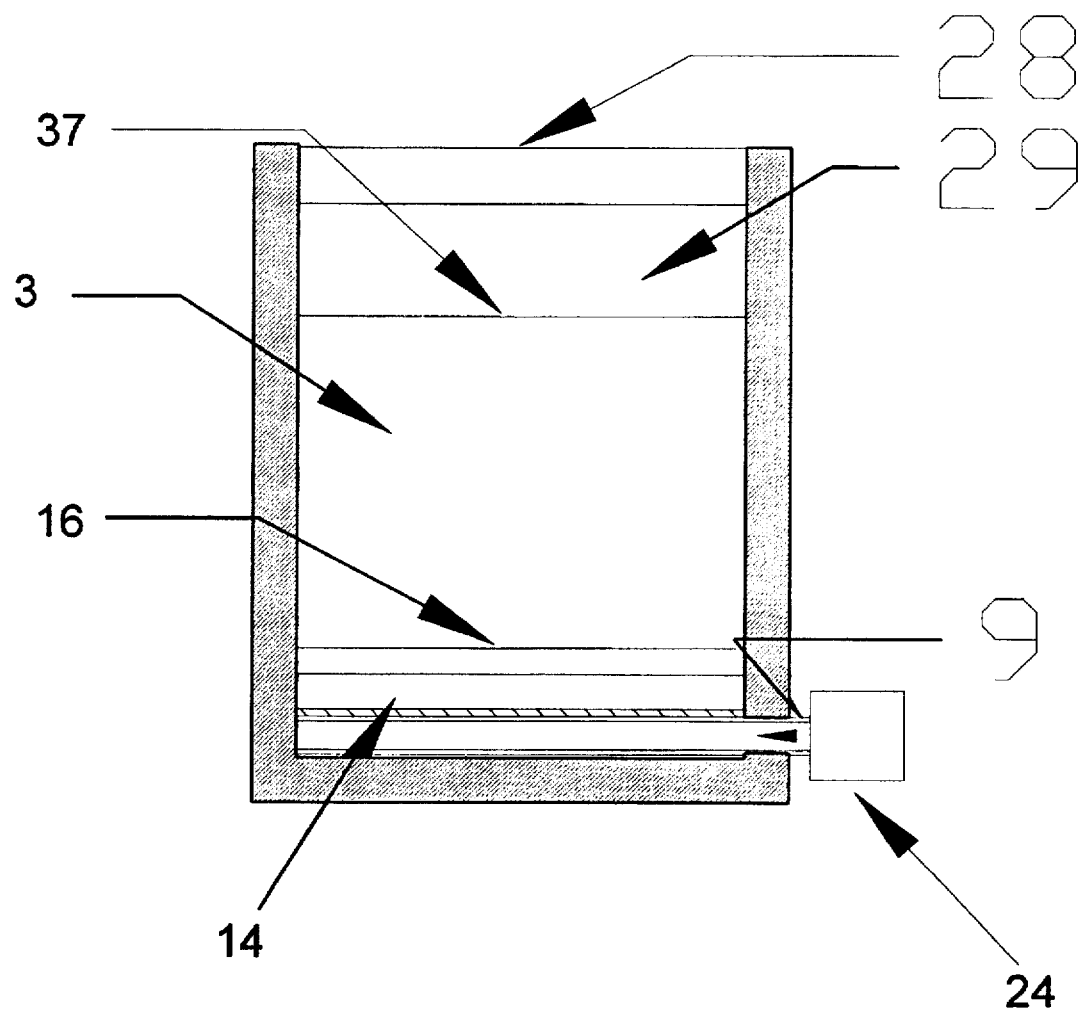
FIG. 9 is a cross-sectional view taken along line 9—9 of FIG. 7.
Figure 10:
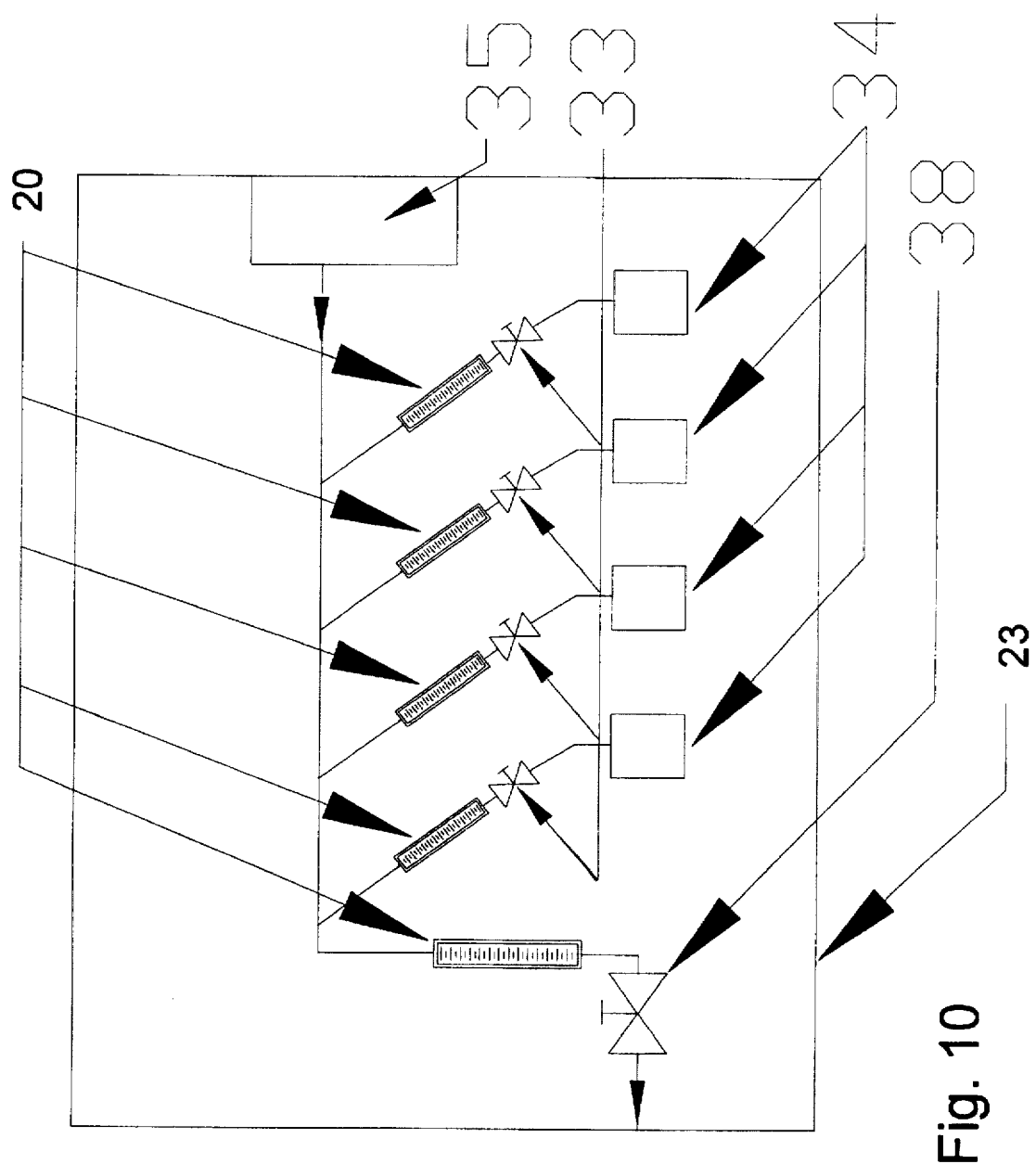
FIG. 10 is a schematic block diagram of a gas flow rate control system used with the apparatus of FIG. 7.
Figure 11:
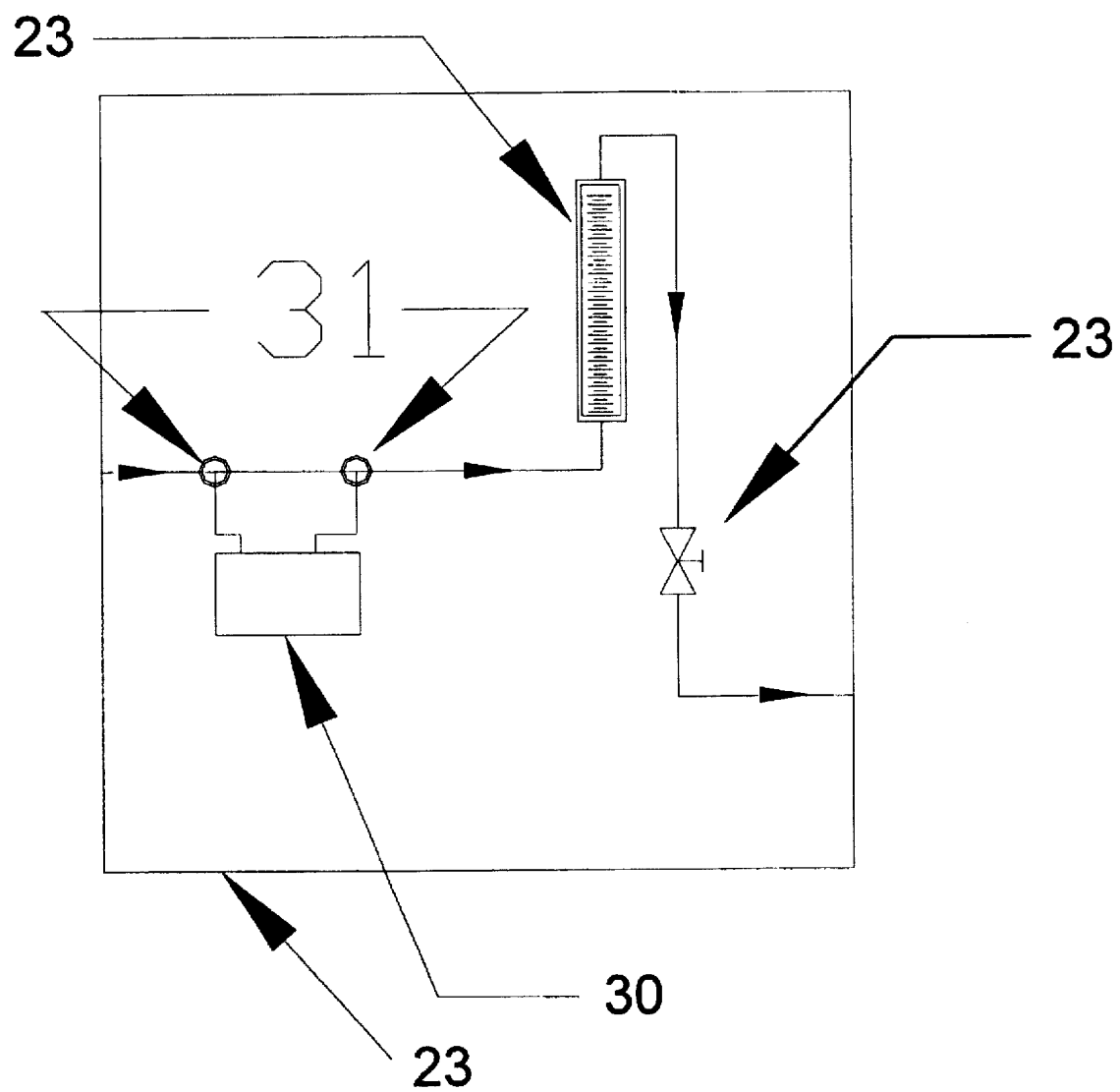
FIG. 11, is a schematic block diagram of a water flow rate control system used with the apparatus of FIG. 7.
Figure 12:
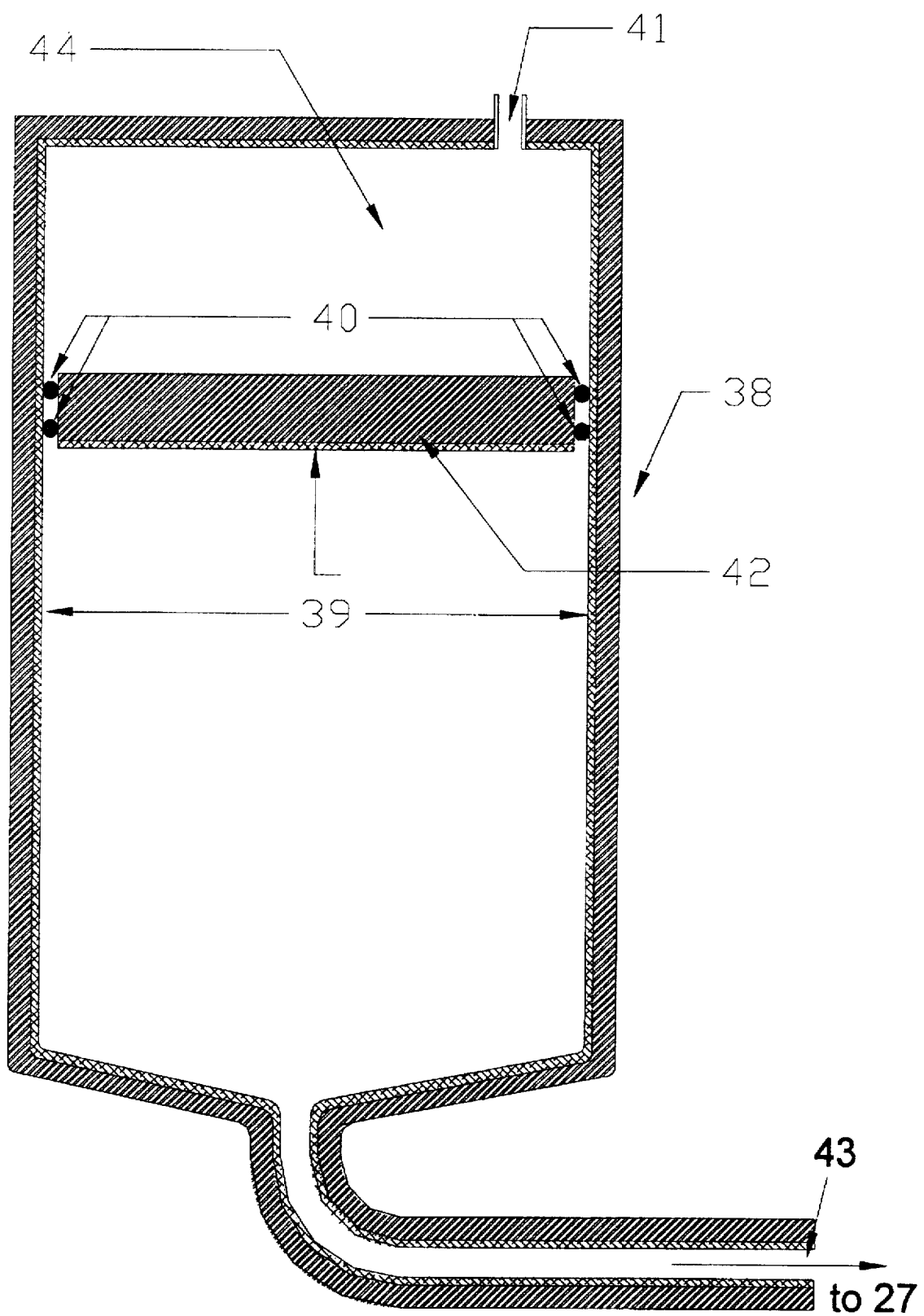
FIG. 12 is a cross-sectional view of a pressure resistant vessel used with the apparatus of FIG. 7.

Referring also to FIG. 6, the gas source 10 may include a main gas source 22 and several auxiliary gas sources 18.

Depending on different contaminants the groundwater is carrying, the gas may be various oxidizing gases or a gas mixture, such as air, oxygen enriched air, oxygen, ozone or other oxidizing gas mixture. Furthermore, carbon dioxide or other gas also can be used to adjust the pH value of the groundwater. Each gas source has its own flowmeter 20 and flow control valve 19 to provide a suitable gas mixture. The gas or gas mixture is pressurized and driven through the injectors 7 into the groundwater. Using such a system, the gas dissolved in the groundwater will produce an oxidizing zone 5 across the contaminant plume 4. The oxidizing zone 5 will oxidize the organic contaminant compounds in the groundwater passing through the oxidizing zone and yield a less contaminated groundwater effluent 11.

The gas injection system comprises several gas injectors 7 connected with each other by flexible connecters 8. The gas injectors and flexible connecters 8 give the system deflectivity (flexibility) for installation in the horizontal well. To prevent the gas injectors 7 from being twisted or otherwise damaged during the installation, the system may be placed on a slide carriage 6, tube or other such devise to control the injectors when being installed in a horizontal well.

Figure 3:
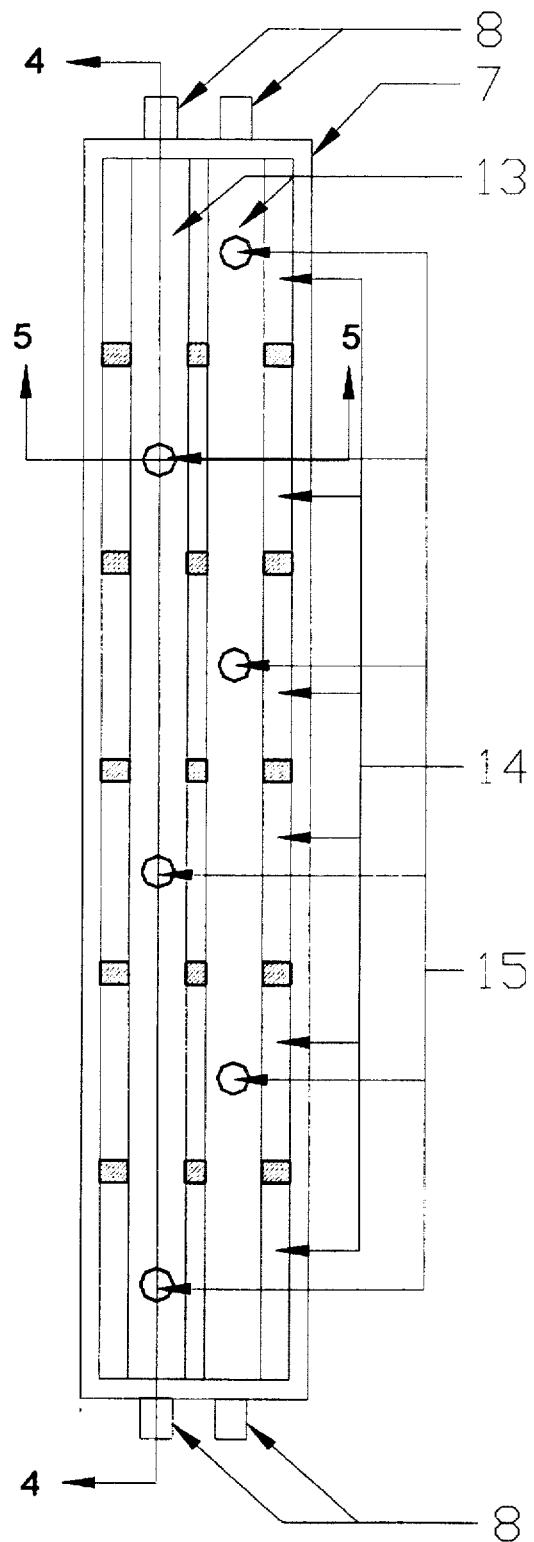
FIG. 3 is a cross-sectional view of a gas injector of the remediation system of FIG. 1, rotated 90° from its normal horizontal installation orientation.
Figure 4:
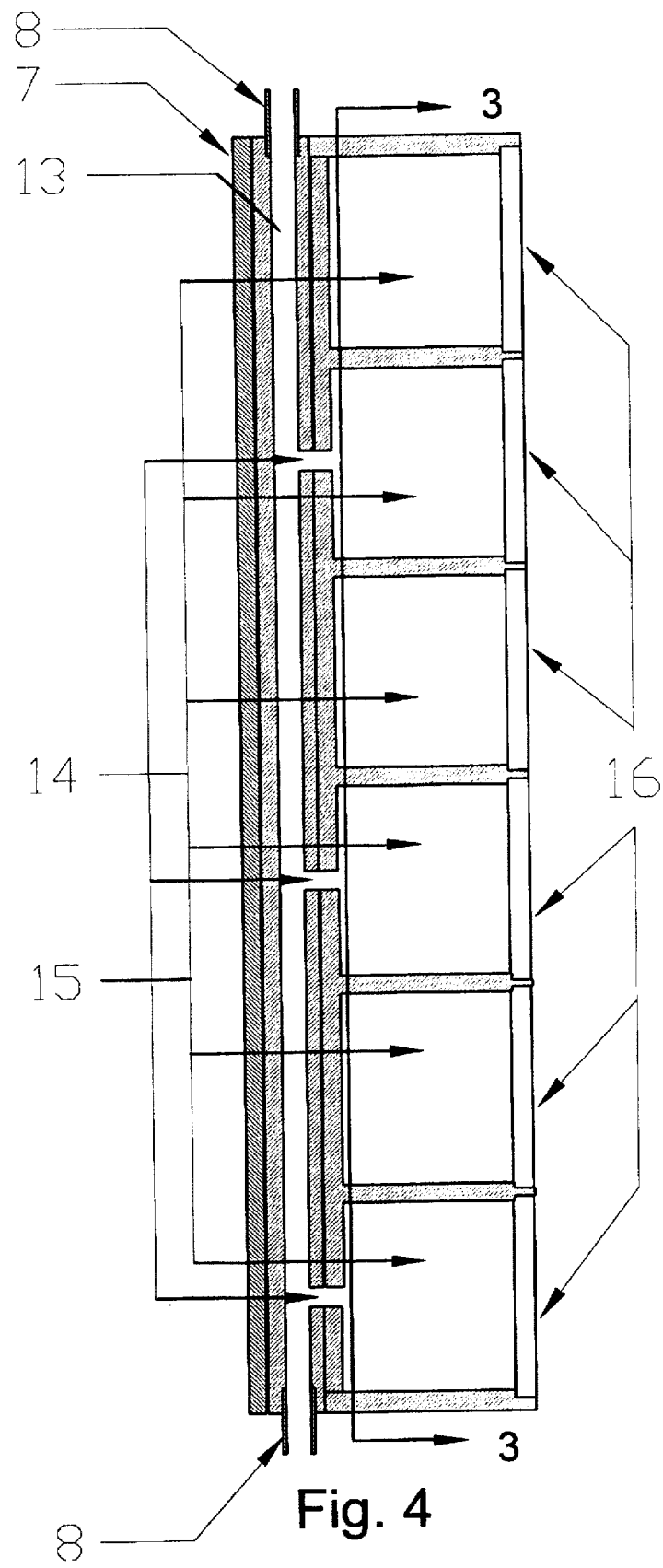
FIG. 4 is a cross-sectional view taken along line 4—4 of FIG. 3.
Figure 5:
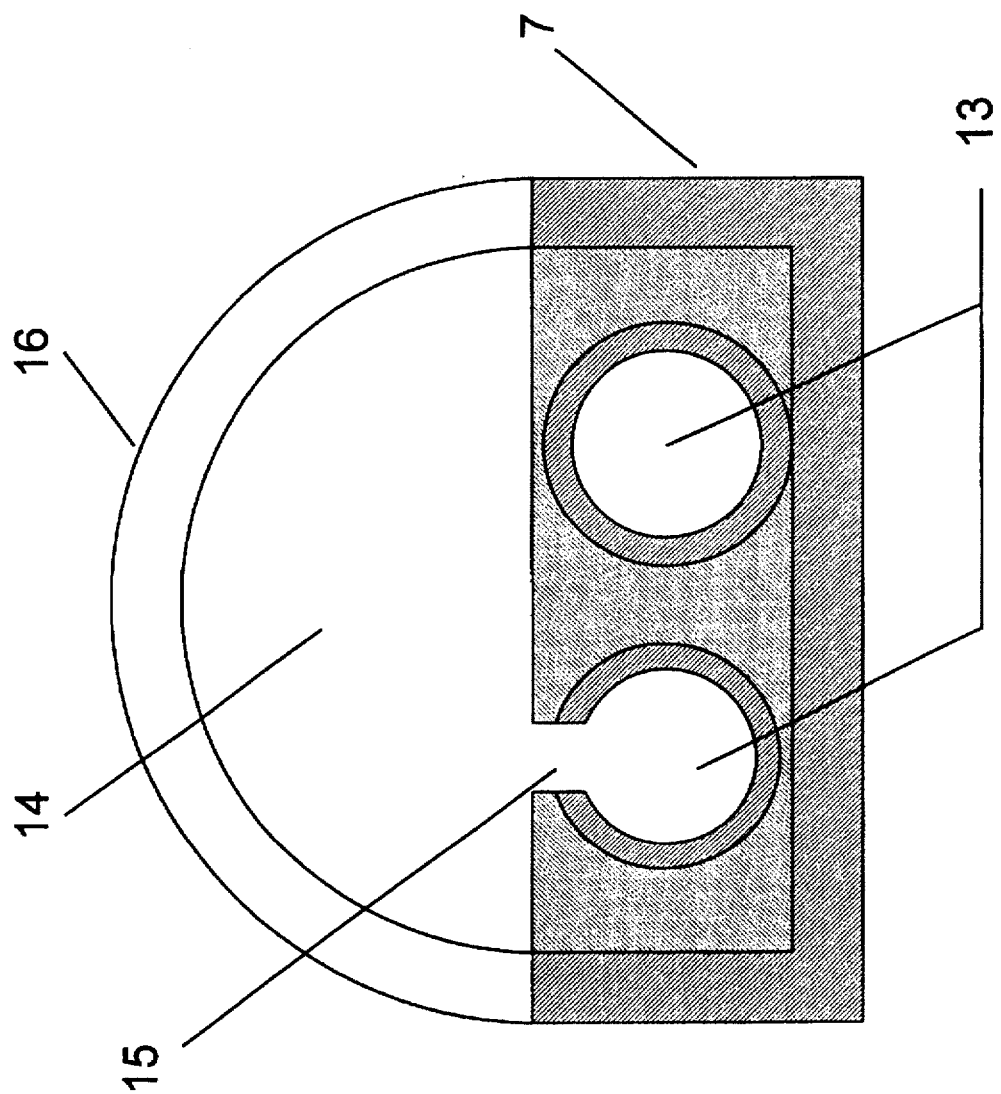
FIG. 5 is a cross-sectional view taken along line 5—5 of FIG. 3.

Referring to FIGS. 3, 4 and 5, the gas injectors include two sets of gas tubing 13 and several separated injection chambers 14. Each set of the gas tubing includes a small penetrated hole 15 in every other chamber, and the two tubes have staggered holes 15 with respect to each other. Therefore, the two sets of gas tubing provides two interlacing gas injector systems. In case that one set of gas injectors is damaged, another set of gas injector system can still keep the system working.

The chambers 14 may be covered by gas permeable porous ceramic shells 16. The porous shells 16 are capable of passing gas bubbles of very small size (e.g. a few microns in diameter). With the shell, buoyant force of the gas bubbles cannot exceed the surface tension holding the bubbles to the aquifer medium. In order to move upwardly, the gas bubbles have to accumulate on the aquifer medium until their buoyant force exceeds the holding force. The accumulation process will provide the groundwater above the gas injectors enough time to dissolve the gas. When the gas releasing flow rate is approximately equal to the rate of the groundwater dissolving the gas and the total volume of the released gas at any given time interval is no more than the solubility of the gas in the contaminated groundwater passing through the oxidizing zone 5 (FIGS. 1 and 2) during the same period, the gas bubbles should be maintained in the contaminant plume to preclude the gas from producing secondary pollution, which means that the gas bubbles strip volatile contaminants from the contaminant plume, bear it and dissolve it into the upper part of clean groundwater or release into atmosphere. Furthermore, the ceramic shell 16 is capable of protecting the injector 7 from erosion of oxidizing groundwater.

To prevent the system from failing to decontaminate the groundwater after installation of the system, a preliminary examination procedure may be conducted to ensure the efficacy of the system for treating the contamination and for selecting the best gas for use in the particular contamination situation. This preliminary examination is performed using the auxiliary apparatus of FIGS. 7–12. It is an objective of the auxiliary apparatus to examine if the system can decontaminate the given groundwater and aquifer.

The apparatus basically is a physical simulation model of the contaminated aquifer and groundwater under the influence of the oxidizing zone formed by the gas injector system. It employs a pressure resistant sand receptacle 21 (FIG. 6) with a transparent top 28 (lens or viewing port), a gas injector 32, a pressure resistant vessel 44, two flow rate control systems, water 23 and gas 24 respectively, and a few sampling ports 25. The pressure resistant vessel 44 includes a piston 42 to separate a compressed air section 50 and a contaminated water section 52. The piston may include seals 40 to prevent air and water from passing around the piston 42. As described in greater detail, the water section 52 includes a sample of the contaminated ground water, and the air section 50 includes air pressure from an air source 41, the air pressure being selected to correspond to the pressure of the ground water when in the ground. The ground water is supplied to the sand receptacle 21 via a valve 27. Both the sand receptacle 21 and the pressure resistant vessel 44 are either made or coated with materials 36, such as glass, stainless steel or plastic, that have no affinity with the organic compounds carried by the groundwater.

The sand receptacle 21 includes a pair of screens 26 at opposing ends thereof. The space between two sets of screens 26 contains a sample of the material of the contaminated aquifer 3 which is directly taken from contaminant field site within the contaminant groundwater plume or in periphery of the plume. The contaminated groundwater will be directly extracted from the groundwater plume and pumped into the water section 52 of the pressure resistant vessel 44 as water source of the apparatus. The control unit of water flow rate 23 can make the water passing through the sand receptacle in same velocity with the ambient flow of the contaminant groundwater in the aquifer. To simulate the field situation closely, the apparatus may have the pressure equivalent to the hydraulic head at the depth of the contaminant groundwater when compressed air 41 is used in the air section 50 of the pressure resistant vessel 44. Under the circumstance, analysis of the sample taken from the sampling ports 25 will provide information that can be used to predict the remediation results after the system installed in the aquifer. In other words, the auxiliary apparatus can be used to estimate how well the oxidizing zone created by a given gas or gas mixture purify the groundwater. Obviously, the same device also provides a useful tool to find suitable gas or gas mixtures that may oxidize the contaminants when the given gas or gas mixture does not perform well.

The releasing gas flow rate can be also determined by the auxiliary apparatus. By adjusting a flow control valve 38, the gas will be released at the rate that the gas bubbles are formed on top of the aquifer material 37 but not buoy up into the water. Under the given condition, the gas injecting rate is equal to groundwater dissolving the gas in the oxidizing zone and less than the solubility of the groundwater passing through the cross section of the receptacle. The correct gas releasing rate in the aquifer can be easily calculated from the ratio between the cross section area of the device and the cross section area of the plume. If the contaminant plume covers significant thickness of the aquifer and the changes in the hydraulic head at different depths may influence the gas dissolving rate and solubility of the gas in the groundwater, and it is preferable that different pressures are used in the test.

Although the invention has been described with respect to exemplary embodiments thereof, it will be understood by those skilled in the art that the foregoing, and various other omissions and additions may be made therein and thereto, without departing from the spirit and scope of the invention.

I claim:

1. A system for producing an oxidizing zone within a saturated zone of an aquifer for in-situ decontamination of groundwater carrying contaminants in a plume wholly located below a water table in said saturated zone of said aquifer, said system comprising:

a source of gas for providing a gas capable of producing an oxidizing environment in said groundwater which can oxidize said contaminant to purify said groundwater and said aquifer;

gas injector means, connected to said source of gas, for injecting said gas into said groundwater below said plume at a gas injection rate, said gas injection rate being selected to limit the advance of said plume in said aquifer, said gas injected at said gas injection rate producing said oxidizing environment in said groundwater for purifying said groundwater and said aquifer without removing said groundwater from said aquifer; and means for determining said gas injection rate including means for simulating said saturated zone of said aquifer using a water sample of said groundwater and a sample of soil, said samples being taken from said saturated zone, and means for applying a test gas to said samples for testing decomposition of said contaminants.

2. The system of claim 1 wherein an area within said aquifer in which said gas is injected into said groundwater is an oxidizing zone which is generally positioned vertically crossing said plume and under said water table.

3. The system of claim 1 wherein said contaminants are organic compounds which are decomposable in said oxidizing environment.

4. The system of claim 1 wherein said gas is selected from a group consisting of air, oxygen, carbon dioxide, ozone or different proportion mixture of at least two of said four gases.

5. The system of claim 1 wherein said gas injector means includes at least one gas injector connected to said source of gas by at least one gas conduit pipe means, and wherein said at least one gas injector is positioned below said plume embedded in at least one horizontal shaft.

6. The system of claim 5 wherein said at least one gas injector includes a gas conduit pipe having at least one opening within a gas chamber, said gas chamber covered at least partially by a gas permeable porous substance through which said gas can pass into said groundwater and said aquifer.

7. The system of claim 6 wherein said gas permeable porous substance is selected from the group consisting of porous ceramic, perforated copper, aluminum, iron, steel, stainless steel, or perforated plastic.

8. The system of claim 5 wherein said at least one gas injector is connected to another gas injector by flexible connecters.

9. The system of claim 1 wherein said gas injector means is fixed on a slide carriage which can be bent and which is resistant to twisting.

10. The system of claim 1 wherein said gas injection rate is selected to maintain said oxidizing environment for adequate decontamination of said groundwater without creating significant secondary contamination in said groundwater.

11. The system of claim 1, wherein said means for determining said gas injection rate includes an apparatus comprising:

a test gas source providing said test gas capable of producing an oxidizing environment in said groundwater which can oxidize said contaminant to purify said groundwater and said aquifer;

an aquifer simulating apparatus means containing said soil sample, said aquifer simulating apparatus means being connected to said test gas source for receiving said test gas into said aquifer simulating apparatus means;

means for applying said water sample to said aquifer simulating apparatus means at a pressure equal to the pressure of said groundwater in said aquifer within said plume; and at least one sampling port in said aquifer simulating apparatus means.

12. The system of claim 11 wherein said test gas is selected from a group consisting of air, oxygen, carbon dioxide, ozone or different proportion mixture of at least two of said four gases.

13. The system of claim 11 wherein said aquifer simulating apparatus means further comprises a water flow rate control apparatus.

14. The system of claim 11 wherein said aquifer simulating apparatus means and said means for applying said water sample are containers having an inside surface covered by at least one layer of a substance having no affinity for said contaminants.

15. The system of claim 14 wherein said substance having no affinity for said contaminants is selected from the group consisting of glass, stainless steel and plastic.

16. The system of claim 14 further comprising a transparent section in said aquifer simulating apparatus above the connection to said test gas source.

\* \* \* \* \*